(12) United States Patent
Wan et al.

(10) Patent No.: US 12,501,137 B2
(45) Date of Patent: Dec. 16, 2025

(54) CAMERA MODULE HAVING SANDWICHED LENS STRUCTURE IN BETWEEN TWO GLASS SUBSTRATES

(71) Applicant: OmniVision Technologies, Inc., Santa Clara, CA (US)

(72) Inventors: Tsung Wei Wan, Hsin Chu (TW); Wei Ping Chen, New Taipei (TW); Jau-Jan Deng, Taipei (TW)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 278 days.

(21) Appl. No.: 18/154,571

(22) Filed: Jan. 13, 2023

(65) Prior Publication Data

US 2024/0244307 A1 Jul. 18, 2024

(51) Int. Cl.
*H04N 23/55* (2023.01)
*H04N 23/54* (2023.01)

(52) U.S. Cl.
CPC ............. *H04N 23/55* (2023.01); *H04N 23/54* (2023.01)

(58) Field of Classification Search
None
See application file for complete search history.

(56) References Cited

U.S. PATENT DOCUMENTS

| | | | |
|---|---|---|---|
| 2011/0032410 A1* | 2/2011 | Shigemitsu | H04N 23/673 348/340 |
| 2011/0255856 A1* | 10/2011 | Reshidko | G02B 13/003 359/717 |
| 2018/0324336 A1* | 11/2018 | Wan | G03B 11/045 |
| 2021/0342565 A1* | 11/2021 | Fan | G02B 3/0056 |

* cited by examiner

*Primary Examiner* — Mark T Monk
(74) *Attorney, Agent, or Firm* — MUNCY, GEISSLER, OLDS & LOWE, P.C.

(57) ABSTRACT

A camera lens module includes an image sensor and a sandwiched lens structure formed over the image sensor, the sandwiched lens structure including a layer lens between a first glass substrate and a second glass substrate, and a baffle formed between the layer lens and the first glass substrate or between the layer lens and the second glass substrate.

19 Claims, 7 Drawing Sheets

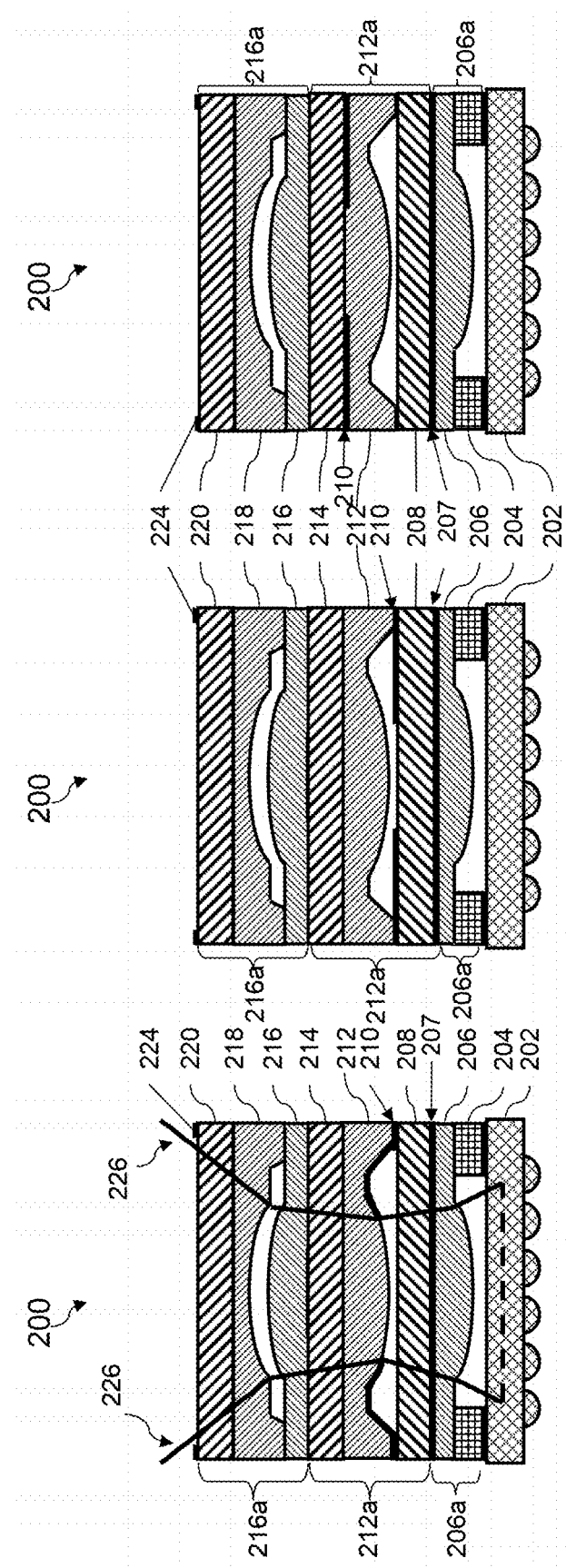

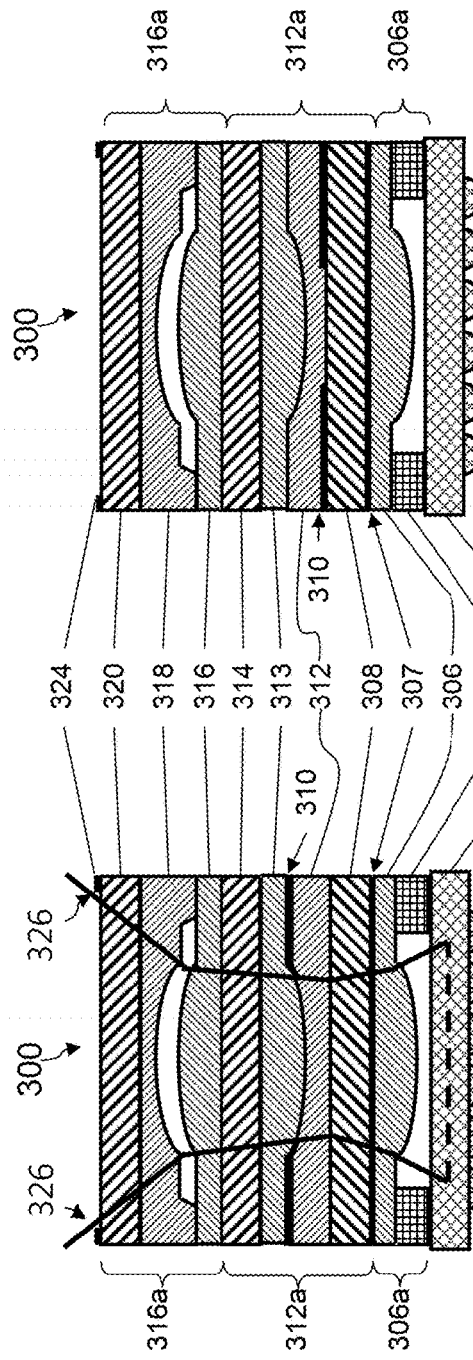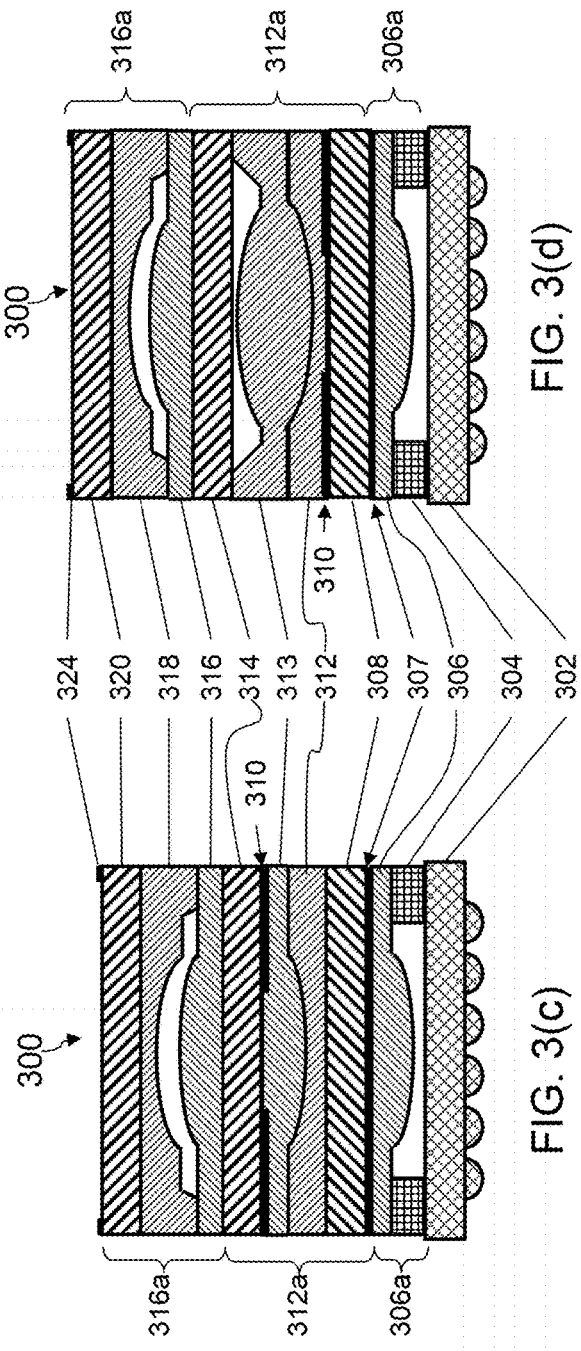

CAMERA MODULE HAVING SANDWICHED LENS STRUCTURE IN BETWEEN TWO GLASS SUBSTRATES

TECHNICAL FIELD

The present invention relates to technology field of camera lens module, and more particularly, a camera module having sandwiched structure with lens in between two glass substrates.

BACKGROUND

Following the development of mobile electronic devices, which have image pick up module, such as camera module integrated inside. As mobile electronic devices, such as smartphones, tablets, etc., are becoming more popular, demands for small, light-weight and low-cost image pickup modules are increasing accordingly.

In order to meet these demands, a wafer-level image pickup module, or called wafer-level camera module (WLCM) has been developed. A lens module (hereinafter, referred to as a wafer-level lens module) for a wafer-level camera module has a stacked structure of transparent substrates and polymer lenses. The wafer-level lens module is manufactured by arranging and stacking a plurality of transparent wafers, each having polymer lenses formed in an array using a replica method, and then cutting them. Accordingly, the wafer-level lens module can be manufactured to be small and light-weight at low cost, which allows for mass production.

Wafer level fabrication techniques provides for efficient and high volume production of optical elements used in optical imaging apparatus.

In addition, a WLCM usually adopts the baffle layer to precisely and effectively block the undesired light such as the ghost image or the flare, which can improve the image quality.

Traditional WLCM 100, as illustrated in FIG. 1, which includes an image sensor 102. A bottom glass substrate 104 is disposed on the image sensor 102. An IR cut filter 106 may be disposed on bottom glass substrate 104. A spacer 108 may be disposed on IR cut filter 106. A first lens 110, which may be a replicate lens, is disposed on spacer 108. A first glass 112 substrate is disposed on the first lens 110. Where the bottom glass substrate 104, the IR cut filter 106, the spacer 108, the first lens 110 and the first glass substrate 112 may form a bottom camera lens module 104a. A stop aperture 114 may be disposed on the first glass substrate 112. A second glass substrate 116 may be disposed on the stop aperture 114, where the stop aperture 114 is between the first glass substrate 112 and the second glass substrate 116. A second lens 118, which may be a replicate lens, may be disposed on the second glass substrate 116. A third lens 120, which is a replicate lens with spacer, may be disposed on the second lens 118. A top glass substrate 124 is disposed on the third lens 120. A baffle 126 is disposed on the top glass substrate 124. The second glass substrate 116, the stop aperture 114, the second lens 118, the third lens 120 and the top glass substrate may form a top camera lens module 104b.

As seen in FIG. 1, the traditional WLCM 100, which has stacked lens structure with stop aperture including the image sensor 102, the bottom camera lens module 104a and the top camera lens module 104b, has some disadvantages. For example, no multilayered lens can be formed in between the first glass substrate 112 and the second glass substrate 116, the stop aperture 114 position is very limited and two stacked camera lens module (104a and 104b) doesn't have good central alignment and rotation tolerance.

To overcome these drawbacks mentioned above, a new wafer level lens structure is therefore needed.

SUMMARY OF THE INVENTION

In one aspect, the present invention provides a camera lens module including a sandwiched lens structure, which can be single layered replicate lens, and a stop aperture disposed in between two glass substrates formed over an image sensor. The stop aperture (baffle) can be placed at various positions of the camera module depended on actual optical design, for example, the stop aperture can be placed on the single layered replicate lens, in between the lens and one of the two glass substrates.

The camera lens module further includes a bottom lens formed between the sandwiched lens structure and the image sensor, and a top lens structure formed on the sandwiched lens structure, the top lens structure including a top glass substrate, at least a top lens formed between the top glass substrate and the second glass substrate of the sandwiched lens structure.

In another aspect, the present invention provides a camera lens module including a sandwiched lens structure, which can be a multilayered lens, and a stop aperture disposed between two glass substrates formed over an image sensor. The stop aperture (baffle) can be placed at various positions of the camera module depended on actual optical design, for example, the stop aperture can be placed on the multilayered lens, in between the multilayered lens, or in between the multilayered lens and one of the two glass substrates.

BRIEF DESCRIPTION OF THE DRAWINGS

The components, characteristics and advantages of the present invention may be understood by the detailed descriptions of the preferred embodiments outlined in the specification and the drawings attached:

FIGS. 2(a)-2(c) illustrate the camera lens module according to one aspect of the present invention.

FIGS. 3(a)-3(d) show the camera lens module according to another aspect of the present invention.

DETAILED DESCRIPTION

Figure 1:
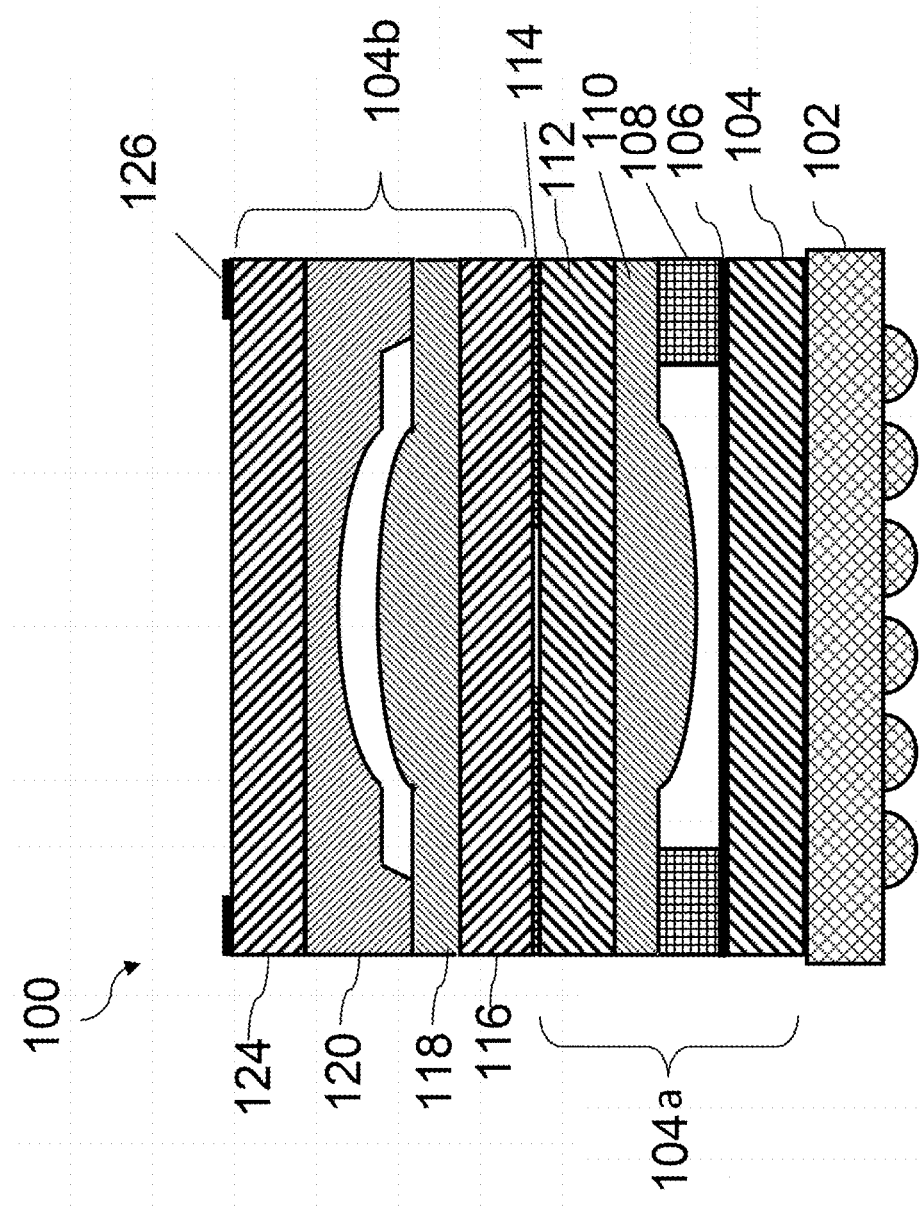
FIG. 1 illustrates a conventional wafer level lens module, according to prior art.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

To solve the issues of raised by conventional WLCM addressed in the background section, a camera module having sandwiched lens structure in between two glass substrates of two corresponding stacked lens is proposed.

According one aspect of the present invention, please refer to FIGS. 2(a)-2(c), which respectively illustrate exemplary camera lens module 200 having single layer lens and stop aperture formed at different locations in sandwiched lens structure. In these exemplary camera modules, a new wafer level lens structure (single layer lens) and stop aperture are introduced between two glass substrates of two corresponding stacked lens structure.

As depicted in FIG. 2(a), the camera lens module 200 includes an image sensor 202, a sandwiched lens structure 212a formed over the image sensor 202, a bottom lens structure 206a including a bottom lens 206, which may be a replicate lens, and a spacer 204 formed between the sandwiched lens structure 212a and the image sensor 202, and a top lens structure 216a formed on the sandwiched lens structure 212a. Spacer 204 is disposed in between the bottom lens 206 and the image sensor 202. The material of the bottom lens 206 is UV curable or thermal resin.

The sandwiched lens structure 212a comprises a single layer lens 212, which may be a replicate lens with spacer, disposed between a first glass substrate 208 and a second glass substrate 214, and a first baffle 210, which is black photoresist (BPR), formed between the single layer lens 212 and first glass substrate 208 extended over a portion of the single layer lens 212 to be a stop aperture over the image sensor 202. The first glass substrate 208 further includes an IR cut/pass filter 207 disposed on the surface of the first glass substrate 208 facing the bottom lens 206. The material of the single layer lens 212 is UV curable or thermal resin.

The top lens structure 216a includes a first top lens 216, which may be a replicate lens, disposed on the second glass substrate 214, a second top lens 218, which is a replicate lens with spacer, disposed on the first top lens 216, a top glass substrate 220 disposed on the second top lens 218. A second baffle 224 is disposed on the top glass substrate 220. The material of the first top lens 216 and second top lens 218 is UV curable or thermal resin.

As shown in FIG. 2(a), incident angle of the light ray 226 around the stop aperture 210 is small, therefore, IR cut/pass filter 207 disposed closer to the stop aperture 210 can reduce spectrum shift (based on Snell's law).

Similar to FIG. 2(a) and related descriptions, the camera lens module 200 illustrated in FIG. 2(b) and FIG. 2(c) have almost same stacked lens structure except the location of stop aperture 210 (the first baffle).

Please refers to FIG. 2(b), the camera lens module 200 includes an image sensor 202, a sandwiched lens structure 212a formed over the image sensor 202, a bottom lens structure 206a including a bottom lens 206, which may be a replicate lens, and a spacer 204 formed between the sandwiched lens structure 212a and the image sensor 202, and a top lens structure 216a formed on the sandwiched lens structure 212a.

The sandwiched lens structure 212a comprises a single layer lens 212, which may be a replicate lens with spacer, disposed between a first glass substrate 208 and a second glass substrate 214, and a first baffle 210, which is black photoresist (BPR), formed between the single layer lens 212 and first glass substrate 208 to be a stop aperture over the image sensor 202.

In FIG. 2(c), the camera lens module 200 includes an image sensor 202, a sandwiched lens structure 212a formed over the image sensor 202, a bottom lens structure 206a including a bottom lens 206, which may be a replicate lens, and a spacer 204 formed between the sandwiched lens structure 212a and the image sensor 202, and a top lens structure 216a formed on the sandwiched lens structure 212a.

The sandwiched lens structure 212a comprises a single layer lens 212, which may be a replicate lens with spacer, disposed between a first glass substrate 208 and a second glass substrate 214, and a first baffle 210, which is black photoresist (BPR), formed between the single layer lens 212 and second glass substrate 214 to be a stop aperture over the image sensor 202.

Figure 2D:
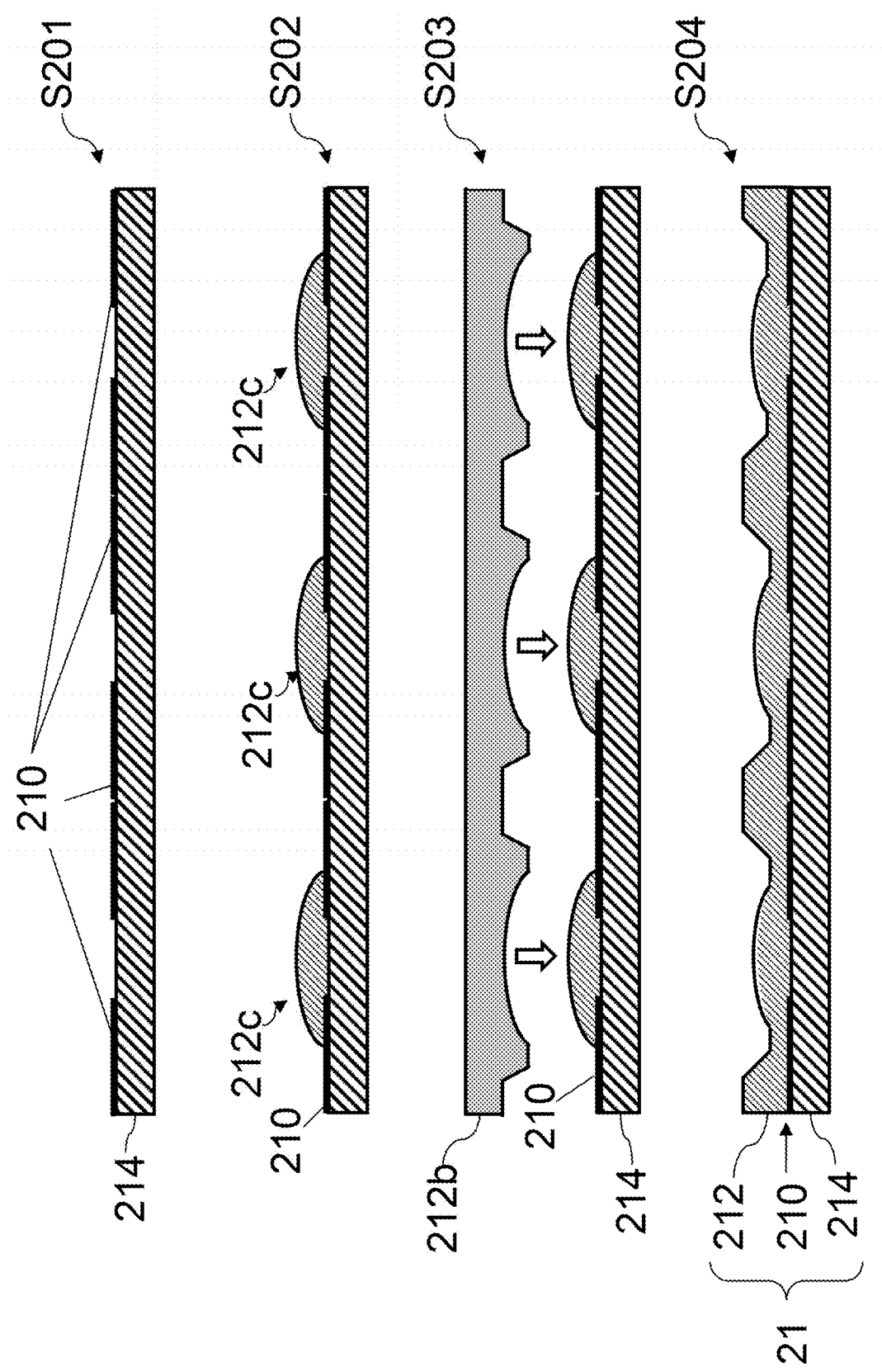
FIG. 2(d) shows exemplary process flow of forming the sandwiched lens structure according to one aspect of the present invention.

FIG. 2(d) shows exemplary process flow of forming the sandwiched lens structure 212a (see FIG. 2(b)). In FIG. 2(d), the exemplary process flow is schematically shown in cross-sectional side view, in step S201, coating baffle 210 on second glass substrate 214; in step S202, dispensing lens material 212c over the baffle 210 and second glass substrate 214, such as UV curable or thermal resin; in step S203, utilizing a lens mold 212b to replicate lens and then curing to solidify the lens; in step S204, removing the lens mold to form lens wafer 21, which includes replicate lens 212 disposed on the baffle 210 and second glass substrate 214. After these steps (S201-S204) completed, the lens wafer 21 is then disposed on the first glass substrate 208 to form the sandwiched lens structure 212a.

According another aspect of the present invention, please refer to FIGS. 3(a)-3(d), which respectively illustrate exemplary camera lens module 300 having multi-layer lenses and stop aperture formed at different locations in sandwiched lens structure. In these exemplary camera modules, a new wafer level lens structure (multi-layer lenses) and stop aperture are introduced between two glass substrates of two corresponding stacked lens structure.

As depicted in FIG. 3(a), the camera lens module 300 includes an image sensor 302, a sandwiched lens structure 312a formed over the image sensor 302, a bottom lens structure 306a including a bottom lens 306, which may be a replicate lens, and a spacer 304 formed between the sandwiched lens structure 312a and the image sensor 302, and a top lens structure 316a formed on the sandwiched lens structure 312a. Spacer 304 is disposed between the bottom lens 306 and the image sensor 302. The material of the bottom lens 306 is UV curable or thermal resin.

The sandwiched lens structure 312a comprises a multi-layer lens, which includes a first layer lens 312 and a second layer lens 313 formed on the first layer lens 312, disposed between a first glass substrate 308 and a second glass substrate 314, and a first baffle 310, which is black photoresist (BPR), formed between the first layer lens 312 and the second layer lens 313 to be a stop aperture over the image sensor 302. The first glass substrate 308 further includes an IR cut/pass filter 307 disposed on the surface of the first glass substrate 308 facing the bottom lens 306. The material of the first layer lens 312 and the second layer lens are UV curable or thermal resin.

The top lens structure 316a includes a first top lens 316, which may be a replicate lens, disposed on the second glass substrate 314, a second top lens 318, which is a replicate lens with spacer, disposed on the first top lens 316, a top glass substrate 320 disposed on the second top lens 318. A second baffle 324 is disposed on the top glass substrate 320. The material of the first top lens 316 and second top lens 318 is UV curable or thermal resin.

As shown in FIG. 3(a), incident angle of the light ray 326 around the stop aperture 310 is small, therefore, IR cut/pass filter 307 disposed closer to the stop aperture 310 can reduce spectrum shift (based on Snell's law).

Similar to FIG. 3(a) and related descriptions, the camera lens module 300 illustrated in FIG. 3(b) and FIG. 3(c) have almost same stacked lens structure except the location of stop aperture 310 (i.e. the first baffle).

Since the camera lens module 300 illustrated in FIG. 3(b) and FIG. 3(c) differ from that of FIG. 3(a) only in the location of the stop aperture 310, so herein below only the stop aperture position will be discussed. In FIG. 3(b), the stop aperture 310 can be placed in between the multi-layer lens and the first glass substrate 308. In FIG. 3(c), the stop aperture 310 can be placed in between the multi-layer lens and the second glass substrate 314.

For the camera lens module 300 illustrated in FIG. 3(d), the stop aperture 310 can be placed in between the multi-layer lens and the first glass substrate 308. Structurally, the sandwiched lens structure 312a illustrated in FIG. 3(d) having a first layer lens 312 formed on the first glass 308, a second layered lens 313 formed on the first layer lens 312, a second glass 314 substrate disposed on the second layered lens 313, where the second layer lens 313 can be a biconvex lens causing air gap formed between the second layered lens 313 and the second glass substrate 314.

Figure 3E:
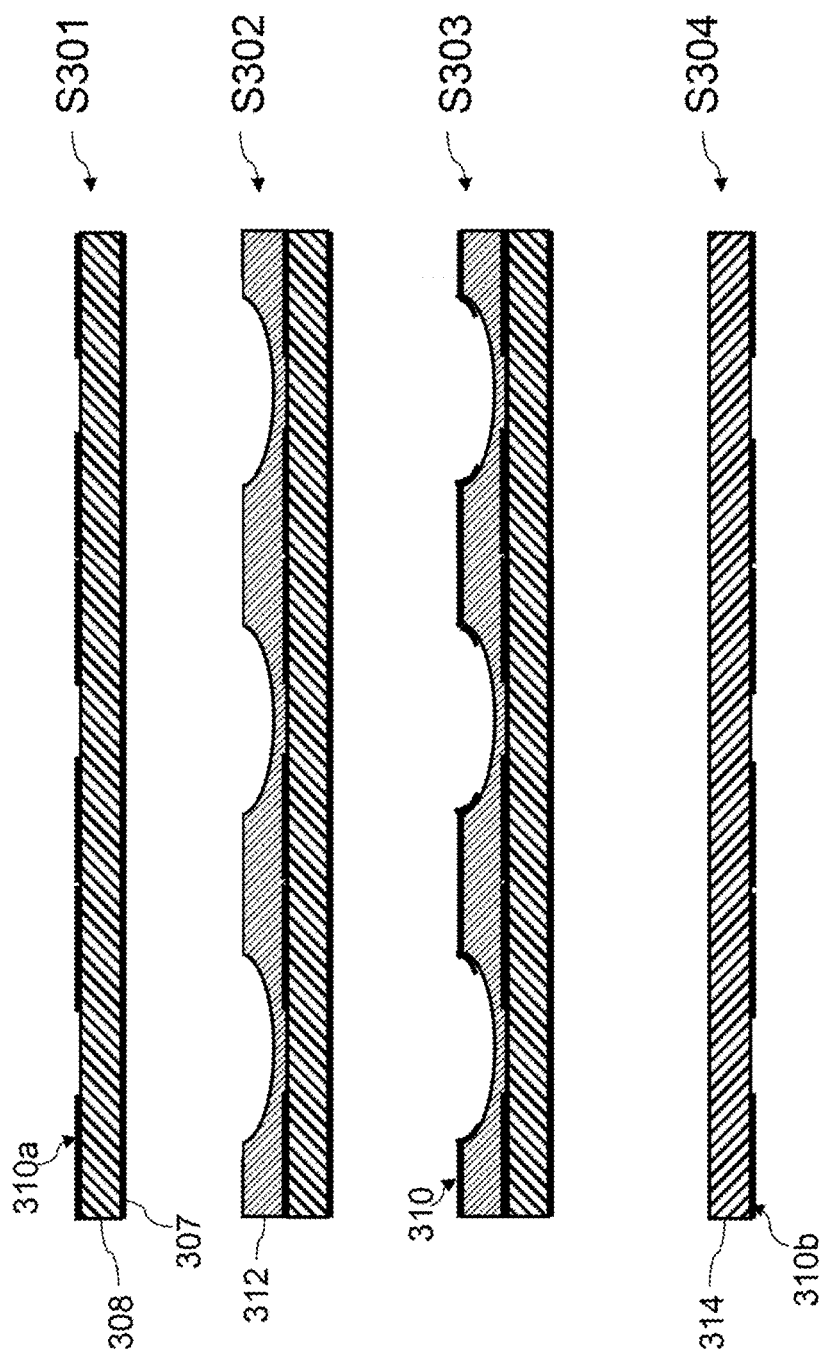
FIGS. 3(e)-3(g) shows exemplary process flow of forming the sandwiched lens structure according to another aspect of the present invention.
Figure 3F:
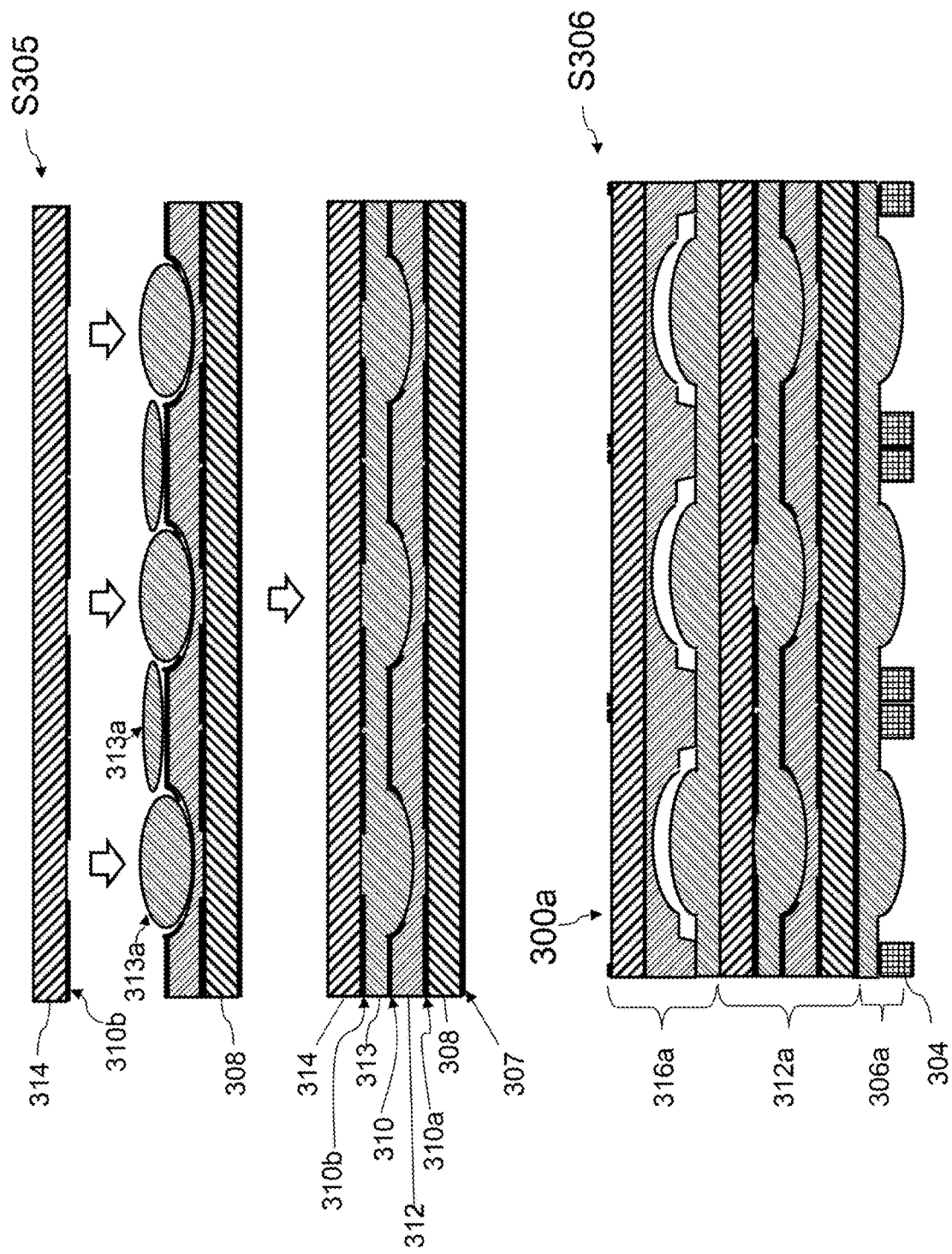
Figure 3G:
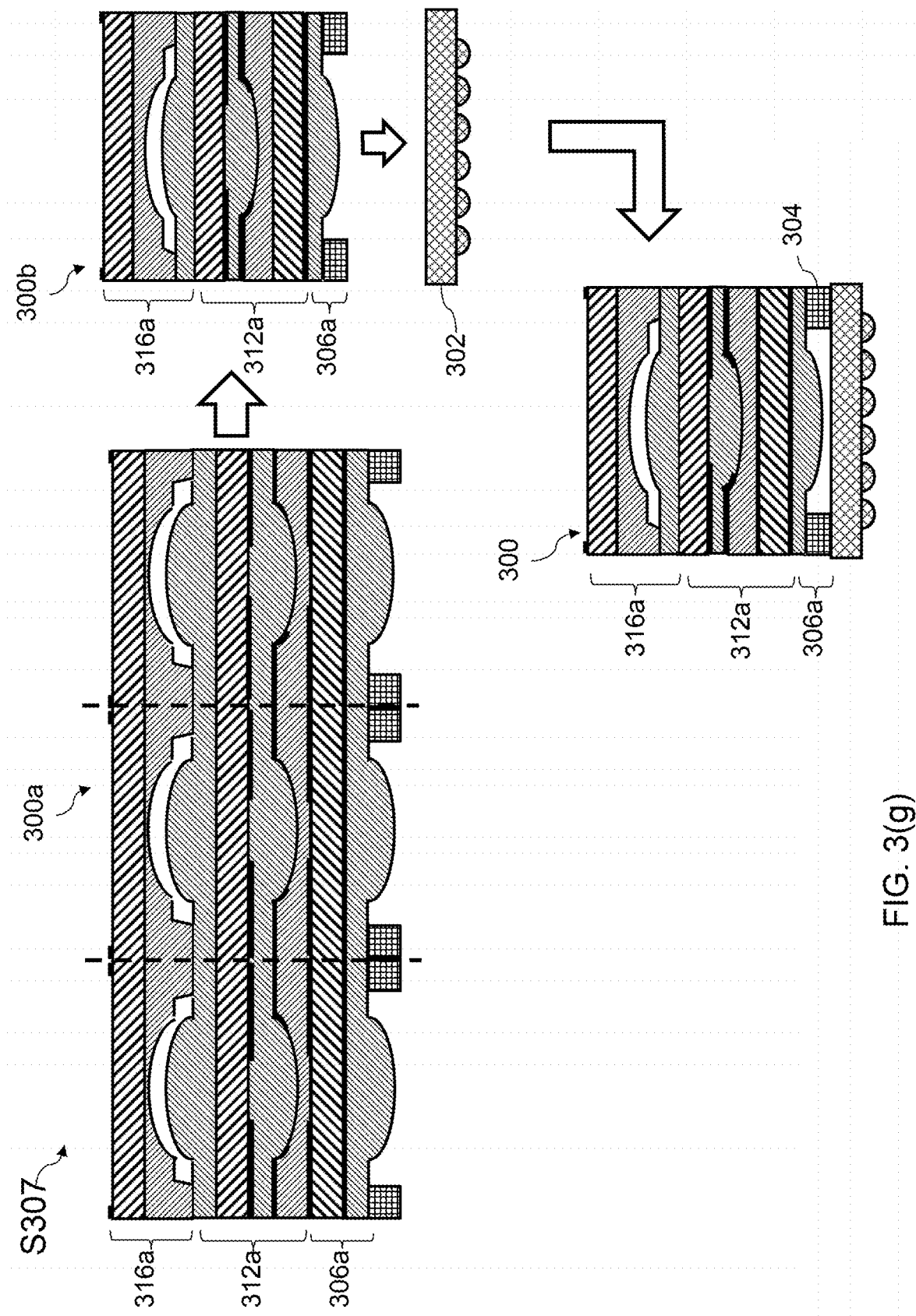

FIGS. 3(e)-3(g) illustrate process flow of forming the sandwiched lens structure 312a and subsequent steps of forming completed camera lens module 300 (see FIG. 3(b)). In FIG. 3(e), the exemplary process flow is schematically shown in cross-sectional side view, in step S301, coating a first light shield coating 310a (optional) and IR cut/pass filter 307 on the first glass substrate 308; in step S302, after dispensing first lens material over the light shield coating 310a and the first glass substrate 308, replicating the first layer lens 312 on the first glass substrate 308 utilizing a lens mold then curing to solidify the replicate first layer lens 312; in step S303, coating a second light shielding coating 310 (optional) on the first layer lens 312; in step S304, coating the third light shield coating 310b (optional) on the second glass substrate 314; in step S305, dispensing a second lens material 313a on the first layer lens 312 and covering the second glass substrate 314 to form the multi-layer lenses stack between the first glass substrate 308 and second glass substrate 314; continue to FIG. 3(f), in step S306, stacking the top lens structure 316a and bottom lens structure 306a together with the sandwiched lens structure 312a to build wafer level lens module 300a; continue to FIG. 3(g), in step S307, dicing the wafer level lens module 300a into individual lens module 300b and stacking onto image sensor 302 to form the camera lens module 300.

Camera module having sandwiched structure with lens (or lenses) and stop aperture in between two glass substrates proposed in the present invention compared with traditional camera lens module can provide more compact size in lateral dimension (X/Y dimension), better central alignment and rotation tolerance, and can put IR cut/pass filter closer the stop aperture to reduce spectrum shift (based on Snell's law).

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A camera lens module comprising:
   an image sensor;
   a sandwiched lens structure formed over said image sensor, said sandwiched lens structure comprising a layer lens between a first glass substrate and a second glass substrate, and a baffle formed between said layer lens and said first glass substrate or between said layer lens and said second glass substrate; and
   a top lens structure formed on said sandwiched lens structure, said top lens structure comprising: a top glass substrate; at least a top lens formed between said top glass substrate and said second glass substrate of said sandwiched lens structure.

2. The camera lens module of claim 1, further comprising a bottom lens formed between said sandwiched lens structure and said image sensor.

3. The camera lens module of claim 2, further comprising a spacer formed between said bottom lens and said image sensor.

4. The camera lens module of claim 1, wherein said baffle is formed on said first glass substrate.

5. The camera lens module of claim 1, wherein said baffle is formed under said second glass substrate.

6. The camera lens module of claim 1, wherein said baffle is formed on a surface of said layer lens.

7. The camera lens module of claim 1, wherein said baffle is formed of black photoresist (BPR).

8. The camera lens module of claim 1, wherein a material of said layer lens is UV or thermal resin.

9. A camera lens module, comprising:
   an image sensor;
   a sandwiched lens structure formed over said image sensor, said sandwiched lens structure comprising a layer lens between a first glass substrate and a second glass substrate, and a baffle formed between said layer lens and said first glass substrate or between said layer lens and said second glass substrate;
   a bottom lens formed between said sandwiched lens structure and said image sensor; and
   wherein said first glass substrate comprises an IR cut/pass filter disposed on a surface of said first glass substrate facing said bottom lens.

10. The camera lens module of claim 1, wherein said baffle formed between said layer lens and said first glass substrate or between said layer lens and said second glass substrate is thereby forming an aperture over said image sensor.

11. A camera lens module, comprising:
    an image sensor;
    a sandwiched lens structure formed over said image sensor, said sandwiched lens structure comprising a multi-layer lens between a first glass substrate and a second glass substrate, and a baffle formed in said multi-layer lens and over said first glass substrate or in said multi-layer lens and under said second glass substrate; and
    a top lens structure formed on said sandwiched lens structure, said top lens structure comprising: a top glass substrate; at least a top lens formed between said top glass substrate and said second glass substrate of said sandwiched lens structure.

12. The camera lens module of claim 11, further comprising a bottom lens formed between said sandwiched lens structure and said image sensor.

13. The camera lens module of claim 12, further comprising a spacer formed between said bottom lens and said image sensor.

14. The camera lens module of claim 11, wherein said multi-layer lens comprises:
    a first layer lens formed on said first glass substrate; and
    a second layer lens formed on said first layer lens.

15. The camera lens module of claim 11, wherein said baffle is formed over said first glass substrate.

16. The camera lens module of claim 11, wherein said baffle is formed under said second glass substrate.

17. The camera lens module of claim 11, wherein said baffle is formed within said multi-layer lens.

18. The camera lens module of claim 11, wherein said baffle is formed of black photoresist (BPR).

19. A camera lens module, comprising:
- an image sensor;
- a sandwiched lens structure formed over said image sensor, said sandwiched lens structure comprising a multi-layer lens between a first glass substrate and a second glass substrate, and a baffle formed in said multi-layer lens and over said first glass substrate or in said multi-layer lens and under said second glass substrate;
- a bottom lens formed between said sandwiched lens structure and said image sensor; and
- wherein said first glass substrate comprising an IR cut/pass filter disposed on a surface of said first glass substrate facing said bottom lens.

* * * * *